(12) United States Patent
Hugh et al.

(10) Patent No.: US 6,278,413 B1
(45) Date of Patent: Aug. 21, 2001

(54) ANTENNA STRUCTURE FOR WIRELESS COMMUNICATIONS DEVICE, SUCH AS RFID TAG

(75) Inventors: Steven C. Hugh, Bothell; Christopher A. Wiklof, Everett; Terry M. Hudkins, Langley, all of WA (US)

(73) Assignee: Intermec IP Corporation, Beverly Hills, CA (US)

( * ) Notice: Subject to any disclaimer, the term of this patent is extended or adjusted under 35 U.S.C. 154(b) by 0 days.

(21) Appl. No.: 09/280,287

(22) Filed: Mar. 29, 1999

(51) Int. Cl.[7] .................................................. H01Q 19/10
(52) U.S. Cl. .................................. 343/818; 343/700 MS; 343/833; 343/834; 340/572.1; 340/572.8
(58) Field of Search .......................... 343/700 MS, 895, 343/833, 834, 818, 819; 340/572.1, 572.8

(56) References Cited

U.S. PATENT DOCUMENTS

| | | |
|---|---|---|
| 3,710,337 | 1/1973 | Grant . |
| 3,852,755 | 12/1974 | Works et al. .......................... 343/701 |
| 4,816,839 | 3/1989 | Landt .................................... 343/795 |
| 4,853,705 | 8/1989 | Landt .................................... 343/803 |
| 5,075,691 | 12/1991 | Garay et al. .......................... 343/830 |
| 5,142,292 | 8/1992 | Chang .................................. 343/742 |
| 5,220,335 * | 6/1993 | Huang ............................ 343/700 MS |
| 5,382,784 | 1/1995 | Eberhardt . |
| 5,430,441 | 7/1995 | Bickley et al. .................. 340/825.54 |
| 5,448,110 | 9/1995 | Tuttle and Lake .................. 257/723 |
| 5,554,974 | 9/1996 | Brady et al. .......................... 340/572 |
| 5,565,847 | 10/1996 | Gambino et al. ..................... 340/572 |
| 5,566,441 | 10/1996 | Marsh et al. ............................ 29/600 |
| 5,712,643 * | 1/1998 | Skladany ........................ 343/700 MS |
| 5,729,201 | 3/1998 | Jahnes et al. ......................... 340/572 |
| 5,786,626 * | 7/1998 | Brady et al. .......................... 257/673 |
| 5,812,065 | 9/1998 | Schrott et al. .................. 340/825.54 |
| 5,923,305 * | 7/1999 | Sadler et al. .......................... 343/895 |
| 5,972,156 * | 10/1999 | Brady et al. .......................... 156/280 |
| 5,973,598 * | 10/1999 | Beigel ................................. 340/572.1 |
| 5,973,600 * | 10/1999 | Mosher, Jr. ........................ 340/572.8 |
| 6,140,146 * | 10/2000 | Brady et al. ............................. 438/62 |

FOREIGN PATENT DOCUMENTS

| | | |
|---|---|---|
| 0595549A2 | 5/1994 | (EP) . |
| 0 718 912 A1 | 6/1996 | (EP) . |

OTHER PUBLICATIONS

Straw, R. Dean (ed.), *The ARRL Handbook for Radio Amateurs*, The American Radio Relay League, Newington, CT, 1999, pp. 20.31–20.37.

* cited by examiner

*Primary Examiner*—Don Wong
*Assistant Examiner*—Hoang Nguyen
(74) *Attorney, Agent, or Firm*—Seed IP Law Group PLLC

(57) ABSTRACT

An antenna structure including a driven antenna element is formed on a substrate that is folded to provide a closed surface, causing the substrate to be nonplanar and spacing the driven antenna element from a base of the substrate. Adhesives on an outside surface of the substrate permit fastening of the folded substrate to a container or packaging. The substrate may have one or more resilient elbows formed by folding, to bias the antenna element carrying portion of the substrate from the base of the substrate. A modulation circuit may drive the driven antenna element. The flexible substrate may be folded into any of a variety of forms such as a substantially O-shape, a substantially oval shape, a substantially coil shape, a substantially spiral shape, and a substantially S-shape. Additional folds in the substrate may provide surfaces for mounting passive or parasitic antenna elements, such as reflectors and directors, to form a Yagi antenna structure. A planar substrate carries a driven antenna element coupled to a driving circuit and at least one passive antenna element to form a directional antenna structure. The antenna structure may include additional passive antenna elements to enhance directionality. A computing system and printer are configured to determine the appropriate spacing and the form the antenna elements on the substrate.

71 Claims, 10 Drawing Sheets

ANTENNA STRUCTURE FOR WIRELESS COMMUNICATIONS DEVICE, SUCH AS RFID TAG

TECHNICAL FIELD

This invention relates to wireless devices, and more particularly to antenna structures for wireless communication devices, such as radio frequency identification tags.

BACKGROUND OF THE INVENTION

Wireless communications devices, including wireless memory devices for storing and retrieving data such as radio frequency identification ("RFID") tags, are generally known in the art. RFID tags available from a number of manufacturers, including Texas Instruments of Dallas, Tex. and Omron of Japan. Such devices typically employ an antenna coupled to an integrated circuit to transmit and/or receive data in the form of signal in some range of the electromagnetic spectrum.

Antenna structures typically employ an active antenna element driven by a transmitter to transmit data in an outgoing signal and/or driven by an external signal from an external source to receive incoming data. Antenna structures may further employ parasitic or passive antenna elements that electromagnetically cooperate with the driven antenna element to enhance the transmission or reception of the signal. The parasitic antenna elements typically include an array of directors and reflectors, the directors being generally shorter, and the reflectors being generally longer, than the driven element. The parasitic antenna elements are normally aligned with and are carefully spaced from the driven antenna element, and one another, typically at a distance of approximately one-quarter of a wave length corresponding to an operating frequency of the antenna. The parasitic antenna elements are also usually tapered to further enhance the signal transmission and/or reception. One common example of such an antenna structure is the Yagi antenna.

The manufacturing of memory devices, such as RFID tags, typically includes forming an antenna structure and electrical connections such as conductive traces and pads on a circuit substrate. the traces and pads coupling an electronic structure such as an integrated circuit to the antenna. The electronic structure typically includes a memory portion and a logic portion. The logic portion controls the reading, writing, or manipulating of data in the memory portion. The logic portion further couples the memory portion to an antenna to form a transmitter, receiver, or transceiver for reading and/or writing data to, or from, the RFID tag. Thus, for example, an RFID tag may receive and transmit RF signals to write data to the memory and to read data from the memory. The antenna typically consists of either a dipole antenna or a coil or loop antenna formed as a single conductive trace on the surface of the substrate.

The substrate can optionally be laminated between a face sheet and a pressure sensitive adhesive covered by a release liner. The optional face sheet can provide a protective layer over one surface of the circuit substrate, thereby protecting the antenna and electronic structure. The optional release liner can provide a selectively removable protective layer over the pressure sensitive adhesive, which a user removes before affixing the RFID tag to an item or container by way of the adhesive.

The existing laminate structures and methods of manufacturing wireless communications devices present certain problems. The manufacturing of such devices presents particular problems due to their typically narrow dimensions. The range of these devices is also typically limited due to their narrow dimensions. Due to the typically thin profile of most memory tags, the antenna is usually positioned extremely close to the item or container to which the memory device is affixed. This antenna placement unfavorably interferes with good communications from the memory device, especially when the underlying container is made of metal. This antenna placement also reduces the overall range of the memory device. Additionally, the current antenna structures do not take advantage of the signal enhancement that is possible using multiple antenna elements, such as directors and reflectors in a Yagi antenna configuration.

While it is possible to build a relatively high profile memory device that spaces the antenna further away from the package or item than current memory devices, such a high profile device leads to other problems. For example, RFID tags may carry printed indicia such as text or a machine readable symbol. The indicia may be printed on the RFID tag by the end user, after the device has been manufactured. Printing on a relatively high profile device would be extremely difficult and would require specialized equipment, if possible at all.

SUMMARY OF THE INVENTION

Under one aspect of the invention, an antenna structure is formed on a flexible substrate that is folded to form a closed surface. The antenna structure includes at least one antenna element, such as a driven antenna element. Folding the substrate to form the closed surface causes the substrate to be nonplanar. The antenna element may be at a location generally opposed to a base of the substrate. The base of the substrate will typically carry an adhesive to affix the substrate to a surface, such as a surface of an item or a container. The folded structure thus spaces the driven antenna element from the item. A modulation circuit such as an integrated circuit may drive the driven antenna element. The flexible substrate may be folded into a variety of shapes, such as a substantially O-shape, D-shape, or oval shape. The folding may form one or more resilient elbows in the substrate to bias the antenna element carrying portion of the substrate away from the base of the substrate.

In another aspect of the invention, additional folds in the substrate may provide additional surfaces for mounting additional antenna elements, for example passive or parasitic antenna elements, including reflectors and directors. The flexible substrate may be folded into a variety of shapes, such as a substantially coil shape, spiral shape, or S-shape. The position of the antenna elements on the substrate and the position of the folds may be such as to align the antenna elements in registration when the substrate is folded. The antenna elements and folds may also be positioned on the substrate to achieve a desired nominal spacing between antenna elements when the substrate is folded. For example, the nominal spacing may be some fraction of a wave length corresponding to a frequency at which the driven antenna element will operate, for example, ¼ λ or ½λ. The antenna elements and folds may be further positioned to achieve a desired directionality for the antenna structure.

In yet another aspect, a planar substrate carries a driven antenna element coupled to a driving circuit and at least one passive antenna element to form a directional antenna structure. The antenna structure may include additional passive antenna elements to enhance directionality.

Figure 1:
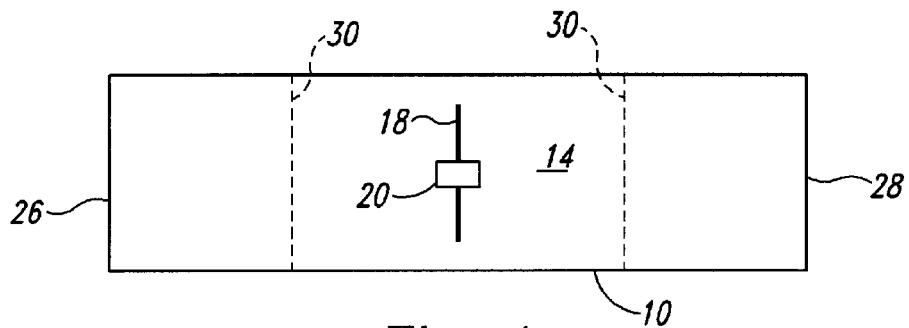
FIG. 1 is a top plan view showing a substrate and a driven antenna element for forming a wireless communications device according to a first exemplary embodiment.

The Figures are not necessarily drawn to scale, but rather represent schematically the structures described in detail below.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with integrated circuits, antennas, radio frequency transmitters and receivers, and machine readable symbologies have not been shown or described in detail to avoid unnecessarily obscuring descriptions of the embodiments of the invention.

FIGS. 1–4 show a substrate 10 for forming a wireless memory device, such as a radio frequency ("RFID") tag 12 according to a first exemplary embodiment. Note: the Figures are not drawn to scale and the relative spacings between various elements shown in the figures are for purposes of illustration only. The substrate 10 is preferably of a flexible sheet type material having very low conductivity (e.g., sheet plastic) and is preferably heat resistant. Examples of suitable materials include polymide, poly-ether-ether-ketone, FR4 and other known dielectric substrates. The substrate 10 includes opposing first and second surfaces 14 and 16, respectively.

A driven antenna element 18 is formed on the substrate 10. While shown on the first surface 14, the driven antenna element 18 may alternatively be formed on the second surface 16, although such a construction would provide less protection to the driven antenna element 18 in this first embodiment. The driven antenna element 18 may consist of any electrically conductive material, for example aluminum or copper. The driven antenna element 18 may be formed by printing on the substrate 10 using a conductive ink or the like. A method and apparatus for printing using conductive ink is disclosed in commonly assigned U.S. Ser. No. 09/082,427, filed May 20, 1998, entitled "METHOD AND APPARATUS FOR MAKING ELECTRICAL TRACES, CIRCUITS AND DEVICES". A memory tag and method of manufacture is disclosed in commonly assigned U.S. Ser. No. 09/164,203, filed Sep. 30, 1998, entitled "MEMORY TAG AND METHOD OF MANUFACTURE"; and U.S. Ser. No. 09/164,200, filed Sep. 30, 1998, entitled "CHIP PLACEMENT ON SMART LABEL". The driven antenna element 18 may, for example, comprise two segments of a conductive trace printed on the first surface 14 to form a dipole antenna.

The RFID tag 12 includes an electronic structure such as an integrated circuit 20 electrically coupling to the driven antenna element 18 and providing a modulated signal thereto. The integrated circuit 20 includes a memory portion in the form of memory circuits and a logic portion in the form of logic circuits for storing, retrieving, and manipulating data in the memory portion. The integrated circuit 20 permits the logic circuit to receive and transmit data externally from the RFID tag 12 via RF signals. The integrated circuit 20 may further include power circuitry for generating power from an RF field. as is conventionally known in the art. Alternatively, the RFID tag 12 may include a discrete power source, such as a battery (not shown).

Figure 3:
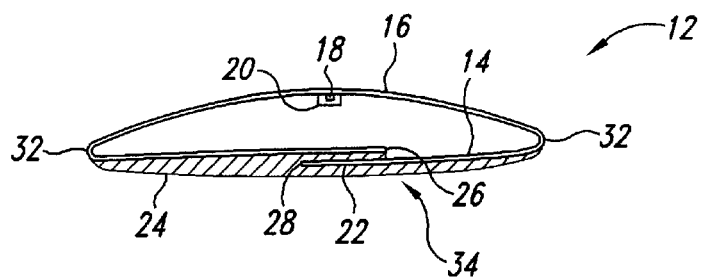
FIG. 3 is a side elevational view of the substrate of FIGS. 1 and 2 folded into an oval.
Figure 4:
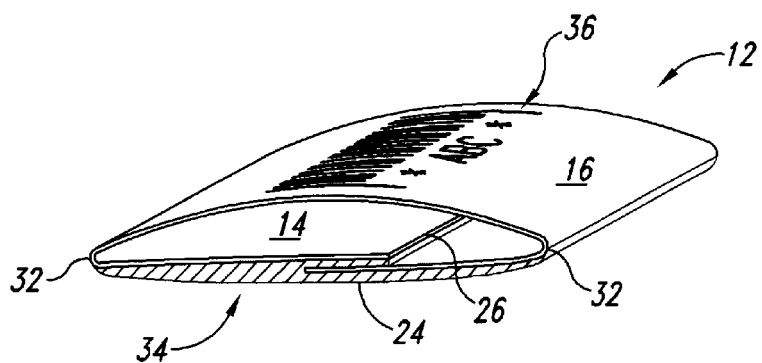
FIG. 4 is an isometric view of the substrate of FIG. 3.

With particular reference to FIGS. 3 and 4, the first exemplary embodiment shows the substrate folded to form a closed surface, the substrate 10 forming a substantially oval or D-shaped cross-sectional device. The substrate 10 may form other cross-sectional shapes, for example an O-shape. An optional portion 22 of pressure sensitive adhesive 24 on the second surface 16 secures a first end 26 of the substrate 10 to a second end 28. Other methods for securing the ends may be used, such as a tab and slot, as discussed below. An optional release liner (not shown) can cover the remaining portion of the pressure sensitive adhesive 24. The release liner is selectively removable by a user for exposing the adhesive 24 before securing the RFID tag 12 to an item or package (not shown), or to further components of the RFID tag 12 such as a backing (not shown).

Figure 2:
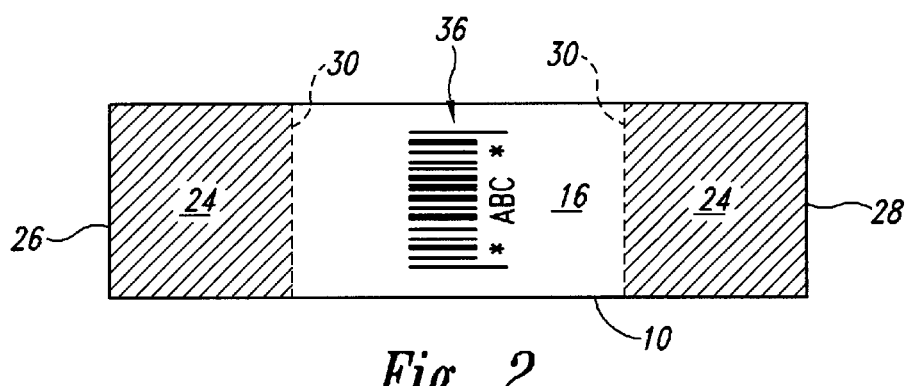
FIG. 2 is a bottom plan view of the substrate of FIG. 1.

With reference to FIGS. 1 and 2, perforations or score lines 30 in substrate 10 permit sharper creases or elbows 32 to be formed when the substrate 10 is folded. Where a resilient material forms the substrate 10, the elbows 32 bias the portion of the substrate 10 carrying the driven antenna element 18 from a base portion 34.

The substrate 10 may carry identifying markings or such as a machine readable symbol 36, trademarks, advertising, marketing information, warnings and/or instructions on the first surface 14 of the substrate 10. The machine symbol 36 may contain information about the operation or contents of the RFID tag 12, or about the item or container (not shown) to which the RFID tag 12 is secured.

Figure 5:
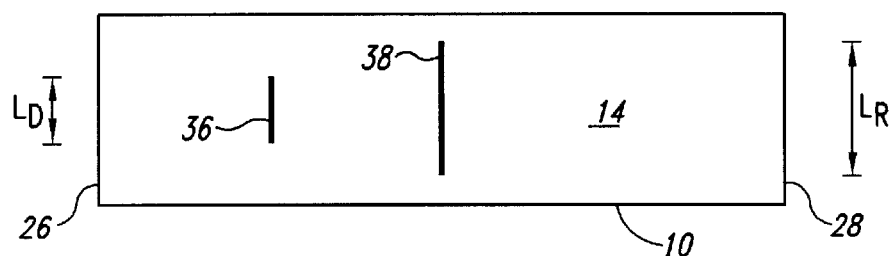
FIG. 5 is a top plan view showing a substrate, a driven antenna element and two parasitic antenna elements for forming a wireless communications device according to a second exemplary embodiment.
Figure 6:
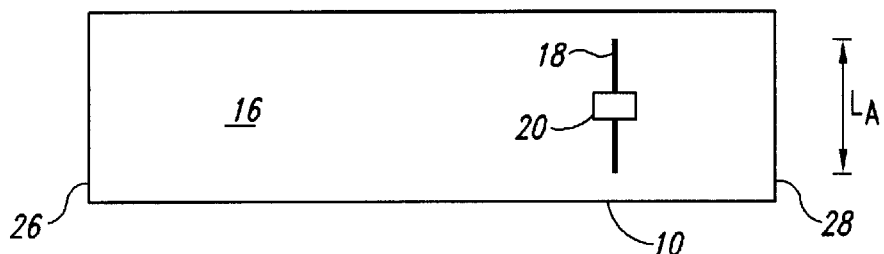
FIG. 6 is a bottom plan view of the substrate of FIG. 5.
Figure 7:
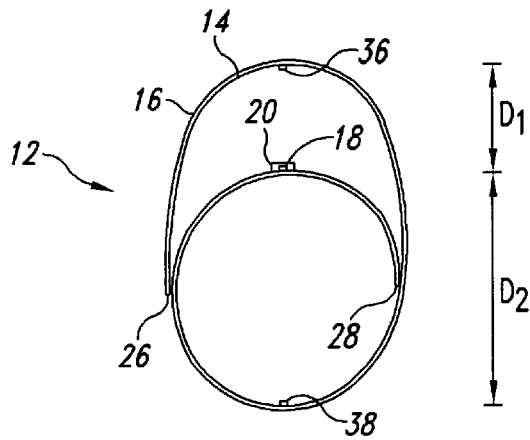
FIG. 7 is a side elevational view of the substrate of FIG. 5 folded into a roll or coil.

A second exemplary embodiment of the RFID tag 12 shown in FIGS. 5–7, includes multiple antenna elements. This alternative embodiment, and those described herein, are substantially similar to previously described embodiments, and common steps and structures are identified by the same reference numbers. Only significant differences in operation and structure are described in detail.

First and second parasitic or passive antenna elements are formed on the first surface 14 of the substrate 10 as a director 36 and a reflector 38. The director 36 and reflector 38 are electrically isolated from the driven antenna element 18 and the integrated circuit 20. The director 36 and the reflector 38 may consist of any electrically conductive material, for example, aluminum or copper, and may be formed by, for example, printing with magnetic ink on the substrate 10. The director 36 and reflector 38 are shown as straight lines, substantially parallel to the driven antenna element 18, although other shapes and orientations are possible. The director has a length $L_D$ that is less than a length $L_A$ of the driven antenna element 18. The reflector 38 has a length $L_R$ that is greater than the length $L_A$ of the driven antenna element 18.

Figure 8:
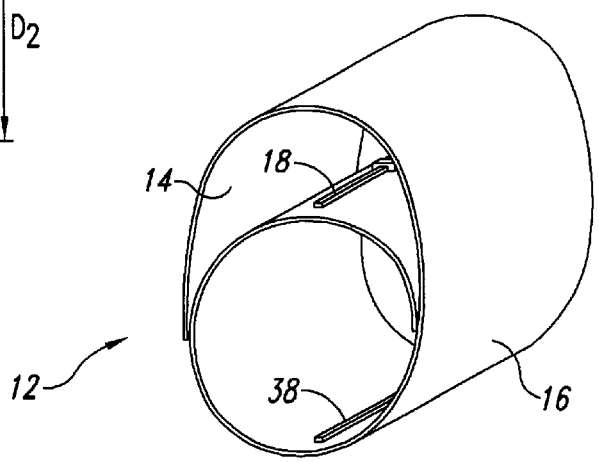
FIG. 8 is an isometric view of the folded substrate of FIG. 7.

With particular reference to FIGS. 7 and 8, folding the substrate 10 into a roll or substantially coiled shape aligns the director 36, reflector 38 and the driven antenna element 18. The folded substrate can thus form a Yagi antenna structure, or some other desired antenna configuration. The director 36 and reflector 38 parasitically or electromagnetically couple with the driven antenna element 18, providing gain to signals received and/or transmitted by the driven antenna element 18. Adhesive may secure appropriate portions of the substrate 10 such as ends 26, 28 to other portions to maintain the shape of the substrate 10.

With particular reference to FIG. 7, the depicted configuration spaces the director 36 from the driven antenna element 18 by a distance $D_1$, that may be equal to some fraction of a wave length corresponding to an operating frequency of the driven antenna element 18. For example, the configuration may space the director 36 from the driven antenna element 18 by a distance $D_1$ equal to one-quarter of the wavelength corresponding to the operating frequency. Similarly, the folding may space the reflector 38 from the driven antenna element 18 by a distance $D_2$ equal to some fraction of the wavelength corresponding to the operating frequency, such as ¼ λ. The distances $D_1$, $D_2$ may be varied to vary the front to back ration of the antenna structure. Varying the distances $D_1$, $D_2$ varies the operating characteristics of the antenna structure such as gain, as is known to one skilled in the art.

Figure 9:
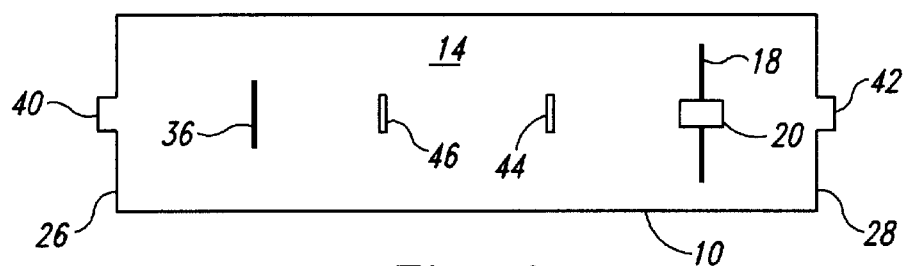
FIG. 9 is a top plan view showing a substrate, a driven antenna element and a pair of parasitic antenna elements for forming a wireless communications device according to a third exemplary embodiment.
Figure 10:
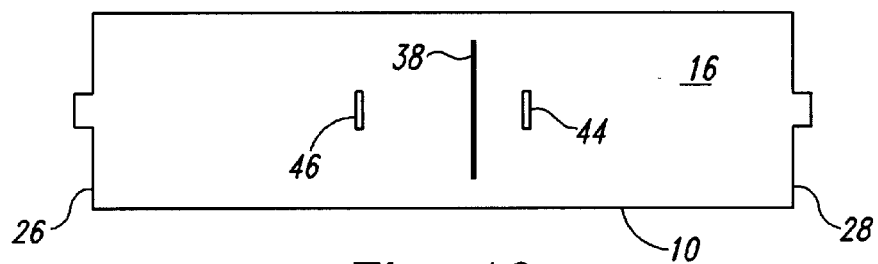
FIG. 10 is a bottom plan view of the substrate of FIG. 9.
Figure 11:
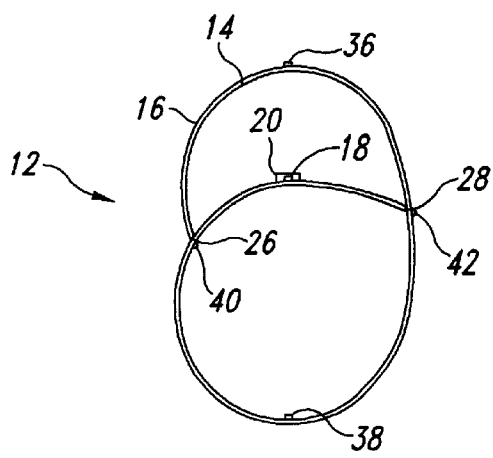
FIG. 11 is a side elevational view of the substrate of FIGS. 9 and 10 folded into a roll or coil shape.

With reference to FIGS. 9–11, a third exemplary embodiment is shown having a different configuration of antenna elements. In this embodiment, the director 36 and driven antenna element 18 are on the first surface, while the reflector 38 is on the second surface 16 of the substrate 10. The substrate 10 includes a first tab 40 at the first end 26 and a second tab 42 at the second end 28. The first tab 40 is receivable in a first slot 44 between the reflector 38 and the driven antenna element 18. The second tab 42 is receivable in a second slot 46 between the director 36 and the reflector 38.

Figure 12:
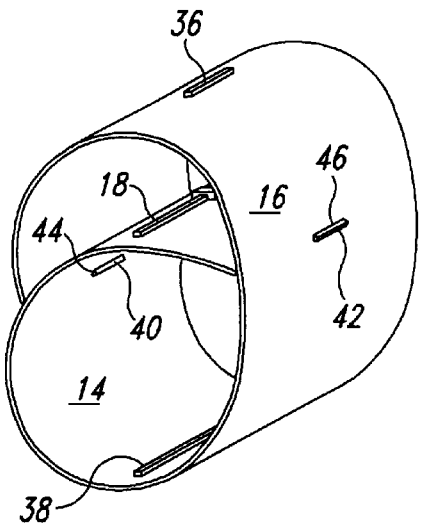
FIG. 12 is an isometric view of the folded substrate of FIG. 11.
Figure 13:
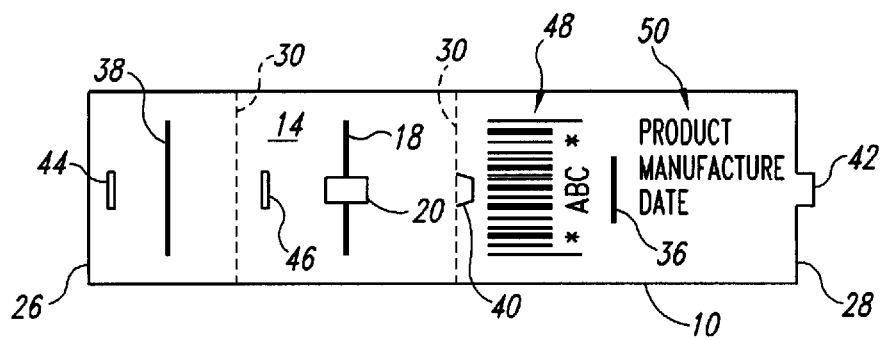
FIG. 13 is a top plan view showing a substrate, a driven antenna element and a pair of parasitic antenna elements for forming a wireless communications device according to a fourth exemplary embodiment.
Figure 14:
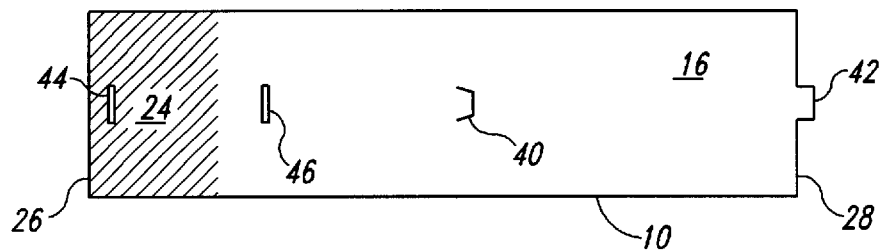
FIG. 14 is a bottom plan view of a substrate of FIG. 13.
Figure 15:
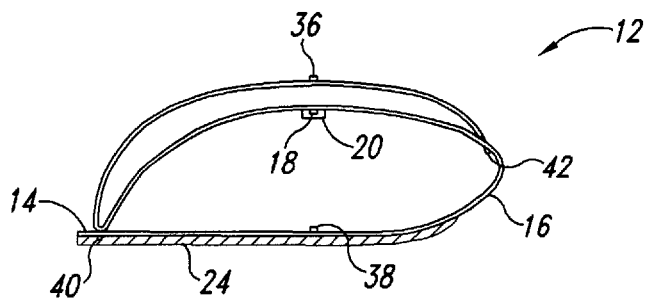
FIG. 15 is a side elevational view of a substrate of FIGS. 13 and 14 folded back on itself to form a substantially S-shape.
Figure 16:
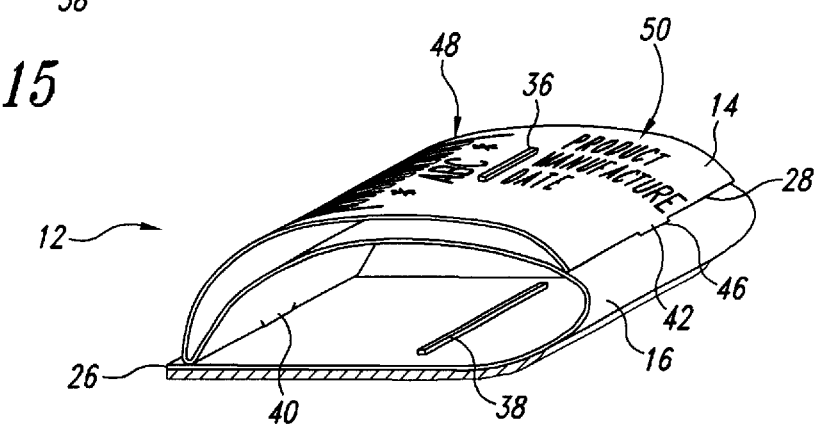
FIG. 16 is an isometric view of the folded substrate of FIG. 15.

With particular reference to FIGS. 11 and 12, folding the substrate 10 into a roll or coil shape locates the director 36 on the outside of the roll. Placement of the reflector on the exterior of the roll may subject the director 36 to damage from, for example, abrasion. A protective covering, such as a face sheet taught in commonly assigned U.S. Ser. No. 09/173,539, filed Oct. 15, 1998, entitled "WIRELESS MEMORY DEVICE AND METHOD OF MANUFACTURE" may protect the director 36 from damage. Additional teachings on protective coverings can be found in commonly assigned U.S. Ser. No. 09/173.137, filed Oct. 15, 1998, entitled "RF TAG HAVING STRAIN RELIEVED STIFF SUBSTRATE AND HYDROSTATIC PROTECTION FOR A CHIP MOUNTED THERETO".

In a fourth embodiment shown FIGS. 13–16, the driven antenna element 18, the director 36 and the reflector 38 are each on the first surface 14 of the substrate 10. The substrate 10 further includes a first tab 40 between the driven antenna element 18 and the director 36. The first tab 40 is defined by a slit in the substrate 10. Flexing the substrate 10 near the score line 30 causes the tab 40 to protrude. The substrate 10 further includes a second tab 42 at the second end 28. The first tab 40 is receivable in the first slot 44 proximate the first end 26 and the second tab 42 is receivable in a second slot 46 when the substrate is folded back on itself into a substantially S-shape.

The substrate 10 may include identifying information such as a machine readable symbol 48 or text 50 printed on the first surface 14. The machine readable symbol 48 or text 50 may encode data concerning the operation of the integrated circuit 20, for example providing a polling code for accessing the RFID tag 12. Additionally, or alternatively, the machine readable symbol 48 and text 50 may encode information concerning the item or container to which the RFID tag 12 will be secured.

Figure 17:
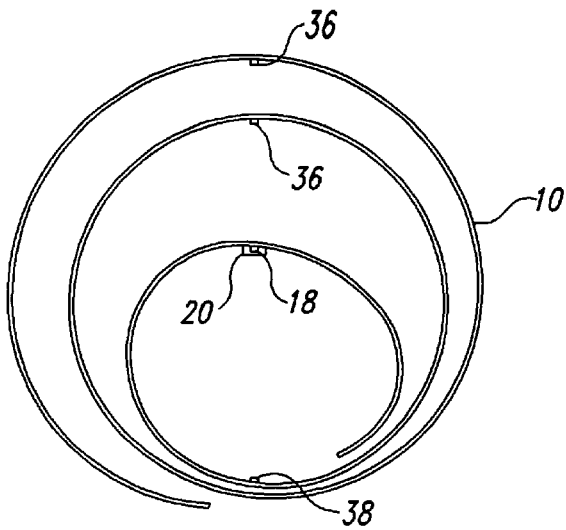
FIG. 17 is a side elevational view of a substrate folded into a substantially coil shape to mount four separate antenna elements.

While previous embodiments have shown one or three antenna elements 18, 36. 38, the structure may employ any number of antenna elements. For example, folding the substrate 10 into a roll or coil as shown in FIG. 17 permits the mounting of four antenna elements in a substantially planar antenna configuration. While the exemplary embodiment of FIG. 17 shows two directors 36 and one reflector 38, the configuration may include one director 36 and two reflectors 38.

Figure 18:
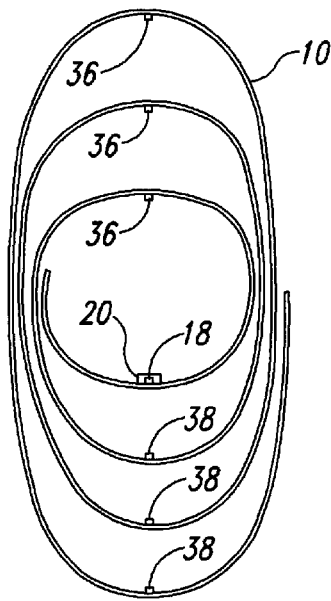
FIG. 18 is a side elevational view of a substrate folded to form a substantially oval spiral shape to mount eight separate antenna elements.

Folding the substrate 10 as a continuous coil as shown in FIG. 18, permits the inclusion of seven antenna elements 18, 36, 38. As shown, the embodiment includes three directors 36, as well as three reflectors 38, in a planar antenna configuration with the driven antenna element 18.

Figure 19:
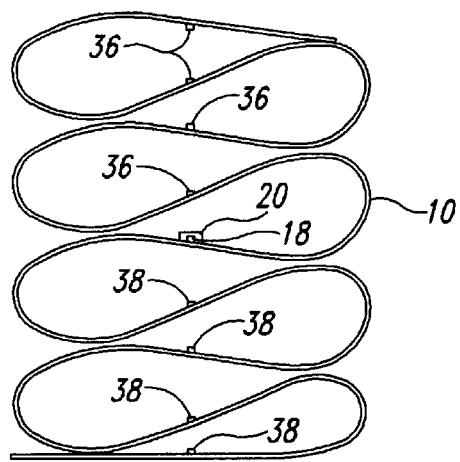
FIG. 19 is a side elevational view of a substrate folded back on itself to mount nine separate antenna elements.

As shown in FIG. 19, the substrate 10 is folded back on itself to permit the mounting of nine antenna elements. As shown, the structure includes a single given antenna clement 18 and four each of directors 36 and reflectors 38. The number of directors 36 and reflectors 38 do not have to be equal.

Figure 20:
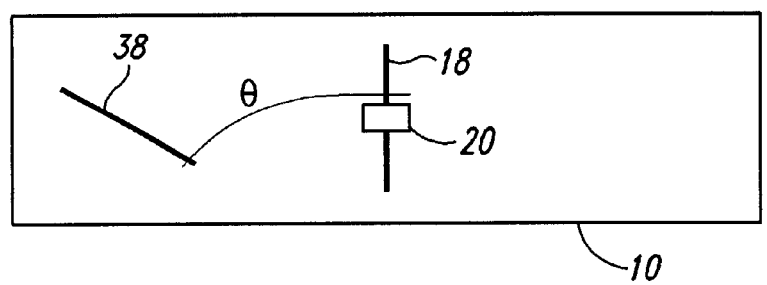
FIG. 20 is a top plan view showing a substrate, a driven antenna element and a parasitic antenna element form at an angle to the driven antenna element.

FIG. 20 shows the reflector 38 on the substrate 10 at an angle θ to the driven antenna element 18. The angle θ is not shown to scale. Varying the angle θ varies the antenna bandwidth. While FIG. 20 only shows the reflector 38 formed at an angle θ to the driven antenna element 18, the director 36 may alternatively, or additionally form an angle θ with respect to the driven antenna element 18. The angle θ of the various directors 36 and reflectors 38 may, or may not have the same measurements.

Figure 21:
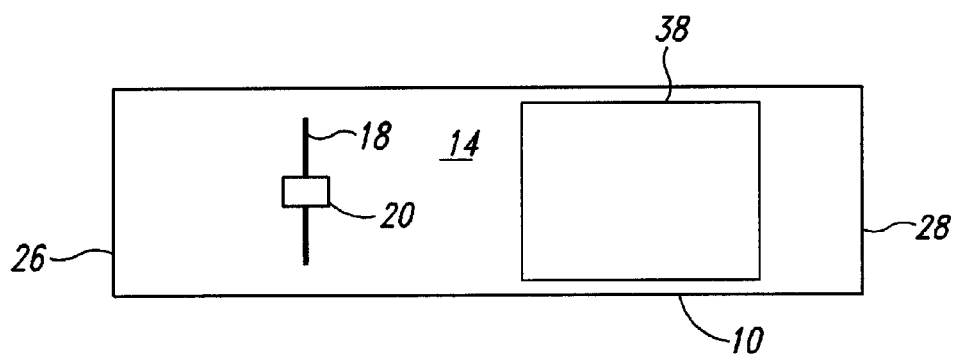
FIG. 21 is a top plan view showing a substrate, a driven antenna element and a rectangular parasitic antenna element.
Figure 22:
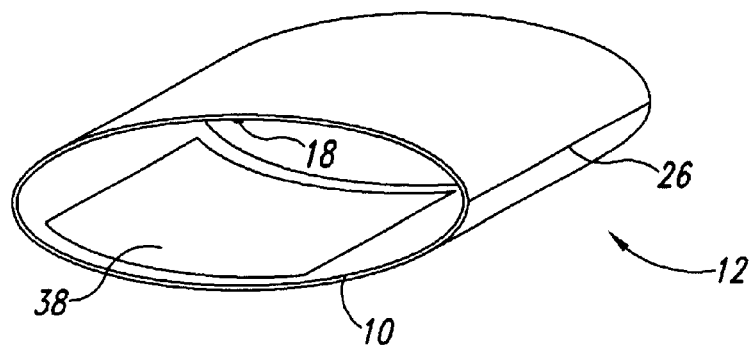
FIG. 22 is an isometric view of the folded substrate of FIG. 21.

FIGS. 21 and 22 show a rectangular parasitic element as reflector 38, formed on the substrate 10 for cooperating with the driven antenna element 18. Thus, the antenna structure can employ shapes other than straight lines. Such differing shapes can be employed to provide a desired RF response.

Figure 23:
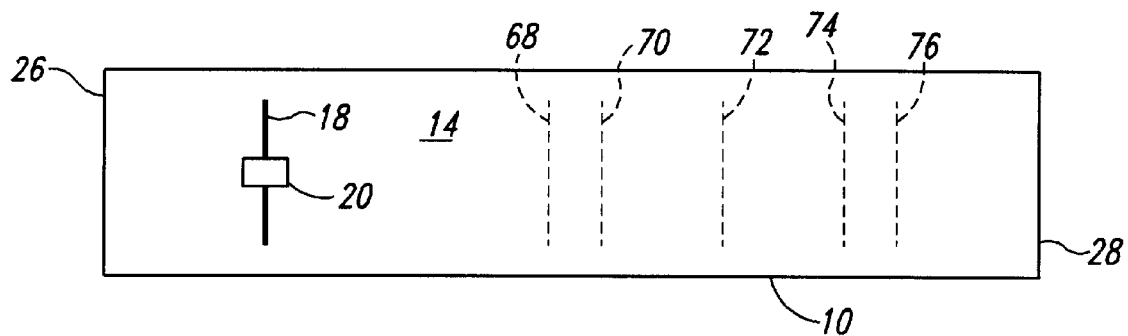
FIG. 23 is a top plan view of a substrate having a driven antenna element and showing five alternative positions for a passive antenna element to provide directionality to the antenna structure.
Figure 24:
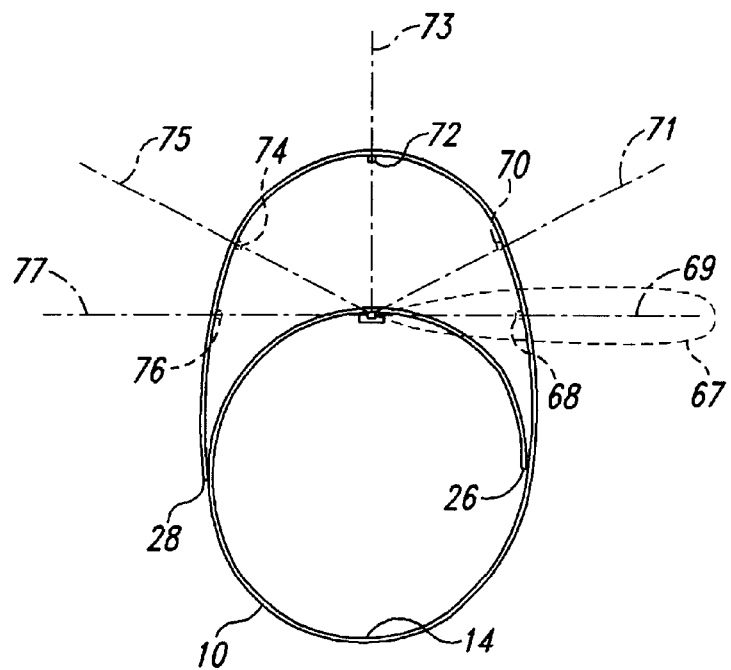
FIG. 24 is a side elevational view of a substrate of FIG. 23, folded into a substantially coil shape and showing the directionality resulting from each of the five possible positions for the passive antenna element, providing enhanced communications along the particular line of directionality.

FIGS. 23 and 24 show in broken lines five optional positions for a passive antenna element (68, 70, 72, 74, 76) to provide directionality to the antenna structure. The directionality is expressed as enhanced communications along a line of directionality (broken lines 69, 61, 73, 75, 77), passing through the driven antenna element 18 and the passive antenna element 68, 70, 72, 74, 76, respectively. While not shown, additional passive antenna elements, such as directors 36 and reflectors 38 (FIG.13) an be positioned along the substrate 10 to align with the driven antenna element 18 and other passive antenna elements to produce or enhance directionality.

Figure 25:
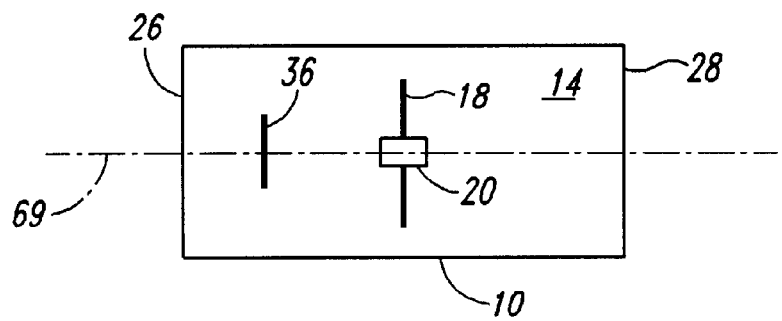
FIG. 25 is a top plan view of an antenna structure including a director providing directionality in the plane of the substrate.

FIG. 25 shows a substrate 10 carrying the driven antenna element 18 and the director 36 to achieve directionality in the plane of the substrate 10. The substrate 10 can be formed of a rigid or relatively stiff material to maintain the shape of the substrate 10 as planar. Alternatively, a flexible substrate 10 may be mounted to a stiffener to maintain the planar shape of the substrate 10. The broken line 69 representing directionality is shown extending farther from the left-hand side 26 of the substrate 10 than the right-hand side 28 to emphasize that while the directionality is generally along a line 69, the directionality can be stronger in one direction along the line 69 than the other. The directionality may take the form of a single lobe 67 (FIG. 24), double lobe, or more lobes formed about the line 69. When viewed in three dimensions the lobe can be a radius of revolution describing an area or volume of enhanced directionality about the line 69.

Figure 26:
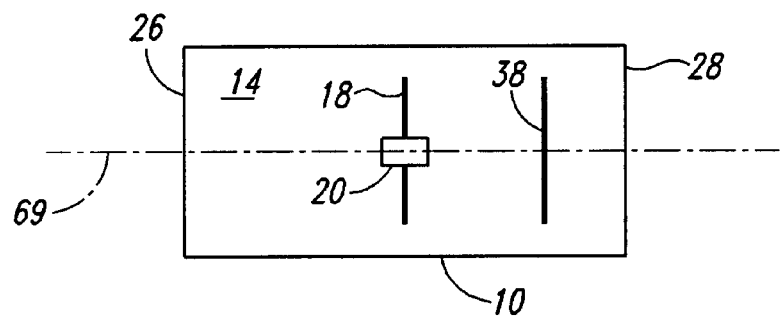
FIG. 26 is a top plan view of an antenna structure including a reflector providing directionality in the plane of the substrate.
Figure 27:
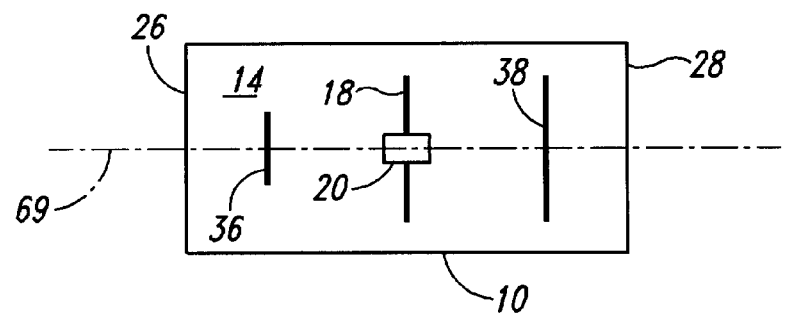
FIG. 27 is a top plan view of an antenna structure including a director and a reflector providing directionality in the plane of the substrate.

FIG. 26 shows an alternative "in-plane" embodiment to the one shown in FIG. 25, including the reflector 38 instead of the director 36. The directionality 69 is substantially the same as in the embodiment of FIG. 25. Similarly, FIG. 27 shows another alternative "in-plane" embodiment including both the director 36 and the reflector 38.

Figure 28:
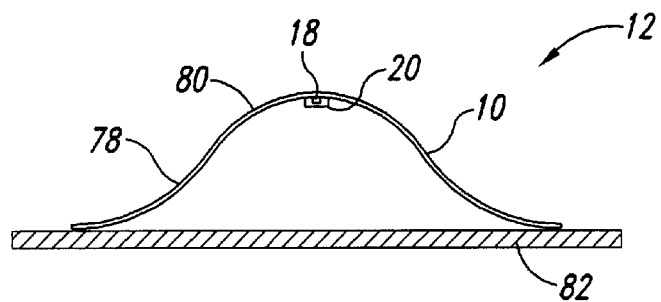
FIG. 28 is a side elevational view of an RFID tag including a non-planar substrate having at least one non-planarity.

FIG. 28 shows a simple RFID tag 12, including a non-planar substrate 10 carrying the driven antenna element 18 and the integrated circuit 20. The substrate 10 includes a non-planarity in the form of bends or concavity 78 and convexity 80, to space the driven antenna element 18 from a second substrate 82. The substrate 82 can be conductive, thus forming the reflector 38 of the antenna structure. The substrate 82 can be a portion of the disposable RFID tag 12, or can be the surface to which the RFID tag 12 is secured. For example, the substrate 82 can be the metal surface of a shipping container, ship, truck or train, to which the RFID tag 12 is secured, for example by way of an adhesive. Alternatively, a conductive trace on the substrate 82 can serve as the reflector 38.

Figure 29:
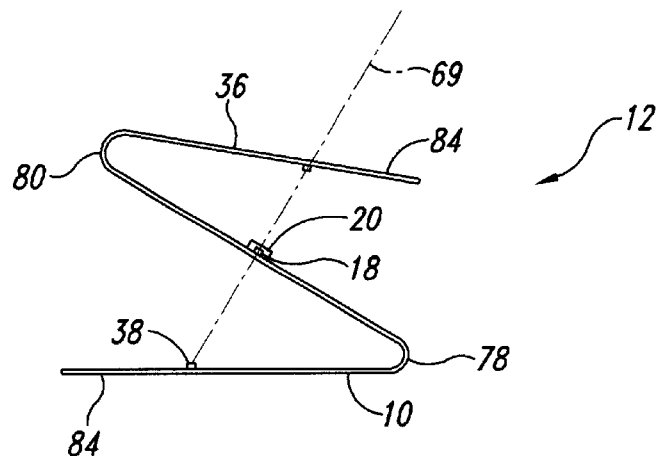
FIG. 29 is a side elevational view of an RFID tag including a substrate having a substantially Z-shaped cross-section.

FIG. 29 shows another simple RFID tag, including a substrate 10 having a substantially Z-shaped cross-section. A pair of legs 84 of the "Z" carry the director 36 and reflector 38. The legs 84 are defined by bends or creases 78, 80 in the substrate 10 define the legs 84. The radius of curvature of the bends or creases 78, 80 can adjust the directionality of the antenna structure shown by line 69. Alternatively, or additionally, the spacing of the driven antenna element 18, the director 36 and reflector 38 can determine the directionality.

From the above examples, one skilled in the art will recognize that any a number of antenna elements may be employed, the primary constraint being the thickness of the resulting RFID tag 12. One skilled in the art will also notice that the substrate 10 acts as spline. Thus, the spacing between the various antenna elements 18, 36, 38 when the substrate 10 is folded is controlled by the positioning of the various antenna elements along the length of the substrate 10, the flexibility or rigidity of the substrate 10, and the resulting radii of curvature of the folded substrate 10. Consequently, computer aided design and manufacturing programs ("CAD/CAM"), for example, employing B-spline mathematics may produce suitable antenna configurations as described more fully below.

Figure 30:
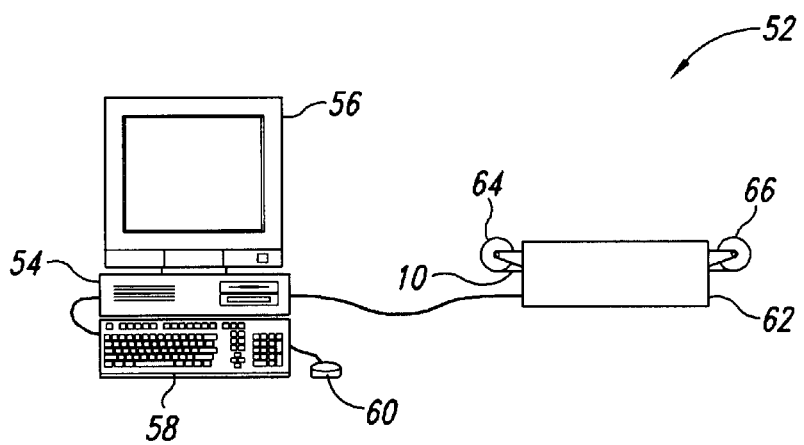
FIG. 30 is schematic diagram of a computer controlled system for designing and manufacturing antenna structures.

FIG. 30 shows a CAD/CAM system 52 including a computer such as a personal computer 54 having an output device such as a monitor 56, and input devices such as a keyboard 58 and a mouse 60. The computer 54 runs software for determining the position of the antenna elements 18, 36, 38 on the substrate 10. The computer 54 may also control a printer 62 to print the antenna elements 18, 36, 38 onto the substrate 10 supplied in the form of a continuous web from a supply roll 64 and taken up by a take-up roll 66. Thus, the CAD/CAM system 52 may produce a large number of RFID tags 12 in the form of a continuous web, where individual tags may be later individually cut from the supply roll 64.

Figure 31:
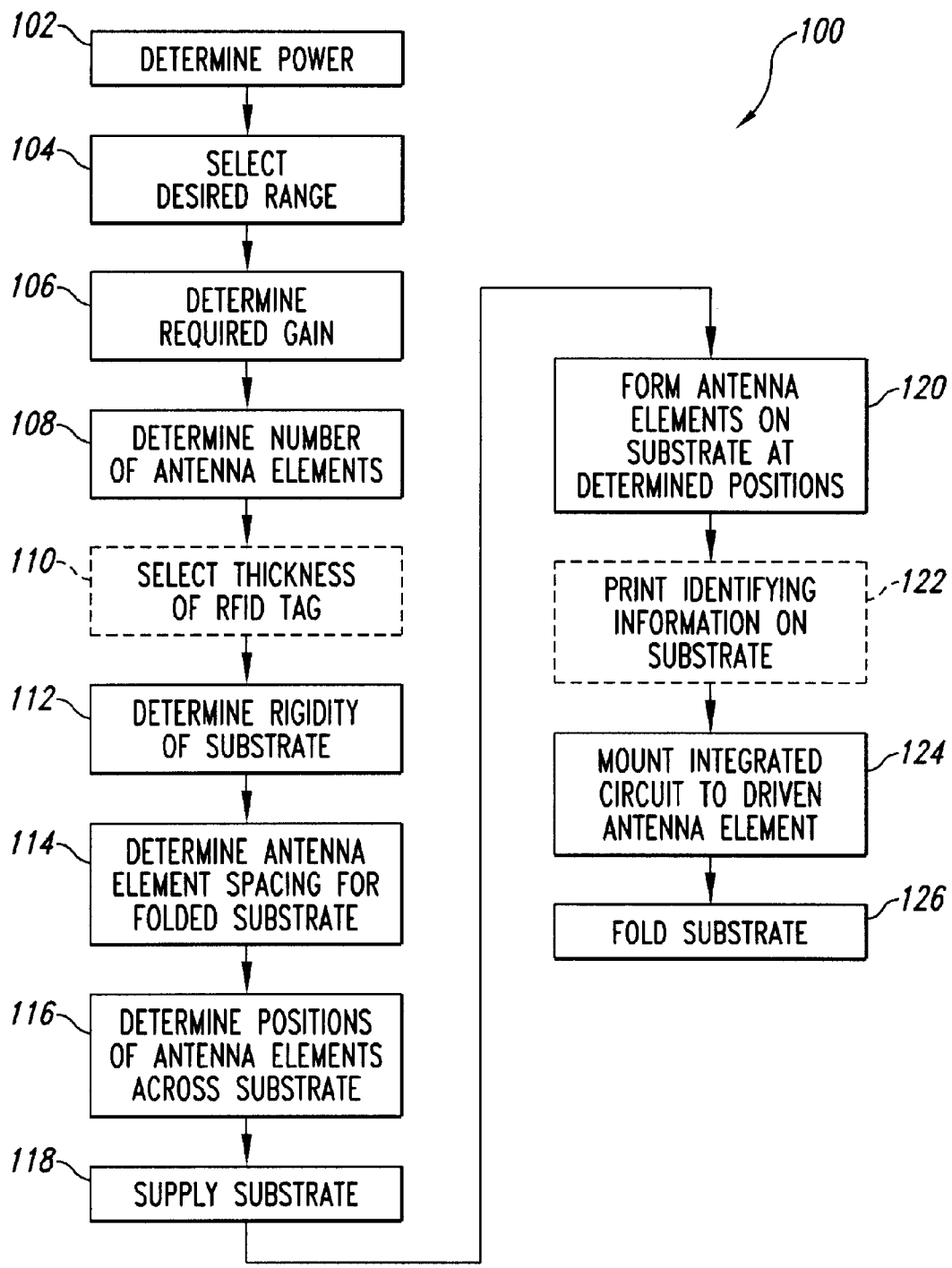
FIG. 31 is a flowchart of an exemplary method of forming an RFID tag.

FIG. 31 shows an exemplary method 100 of forming RFID tags 12. The method 100 may employ the CAD/CAM system 52 to automatically design and/or manufacture the RFID tags 12. In step 102, the computer 54 determines the operating power of the driven antenna element 18 and the integrated circuit 20. A user may enter the power into the computer 54 using one of the input devices 58, 60. In step 104, the user may select a desired range for the RFID tag 12. While the user will generally wish to maximize the range, except in certain situations, maximum range must be balanced with the desire to maintain a relatively small profile for the RFID tag 12.

In step 106, the computer 54 determines the required gain to achieve the desired range based on the determined power. In step 108, the computer 54 employing commonly available equations for antenna structures determines the number of parasitic antenna elements 36, 38 needed to achieve the required gain. The computer 54 may take a numerical or iterative approach to determine the minimum number of antenna elements capable of producing the desired gain.

In optional step 110, the user may select a desired thickness or maximum thickness for the RFID tag 12. Many applications will require the RFID tag 12 to have thickness less than some predefined maximum thickness.

In step 112, the computer 54 determines the rigidity of the substrate 10. The computer 54 may employ a set of look-up tables storing rigidity parameters for commonly used substrate materials. Alternatively, the user may enter the rigidity parameters into the computer 54 using the input devices 58 or 60.

In step 114, the computer 54 determines the desired spacing or distance $D_1$, $D_2$ between the antenna elements 18, 36, 38 when the substrate 10 is folded. The distances $D_1$, $D_2$ will typically be some fraction of the wave length $\lambda$ corresponding to the operating frequency of the driven antenna element 18 and the integrated circuit 20, for example, ¼ $\lambda$. Again, the computer 54 may rely on previously stored information or may rely on information provided by the user.

In step 116, the computer 54 determines the positions of the antenna elements 18, 36, 38 across the substrate 10. Due to the behavioral similarities between the substrate and splines, the computer 54 may employ known b-spline mathematics in calculating the positions. For example, given the rigidity of the substrate 10 and the desired spacing or distances $D_1$, $D_2$, the computer may calculate constraint points for the positions of each antenna element 18, 36, 38, as well as for locations where the substrate contacts itself. While the calculation may be fully automated, the computer may permit the user to set the positions for a number of constraint points, as is common with commercially available CAD packages.

In step 118, a supply reel 64 supplies the substrate 10 in the form of a continuous web to the printer 62. In step 120, the printer 62 forms the antenna elements 18, 36, 38 on the substrate 10. The printer 62 may print on both sides of the substrate, or may require two passes where selected antenna elements 18, 36, 38 are printed on the first surface 14 during the first pass and on the second surface 16 of the substrate 10 during the second pass. As discussed above, the printer 62 may employ magnetic ink to form the antenna elements 18, 36, 38 as conductive traces on the substrate 10. In optional step 122, the printer 62 may print identifying information such as the machine readable symbol 48 and text 50 on the substrate 10.

In step 124, the pick and place machinery (not shown) mounts the integrated circuit 20 to the substrate 10, electrically coupling the integrated circuit 20 to drive the driven antenna element 18. Pick and place machinery is commonly known and available, and may be incorporated within the printer 62. In step 126, the substrate 10 may be folded into the desired shape to form the RFID tag 12. Folding may be automatically or manually accomplished The teachings of the ARRL HANDBOOK FOR RADIO AMATEURS, Seventy-sixth Ed., published by the American Radio League. Newington, Conn., and all above patents and applications are incorporated herein by reference.

Although specific embodiments of, and examples for, the invention are described herein for illustrative purposes, various equivalent modifications can be made without departing from the spirit and scope of the invention, as will be recognized by those skilled in the relevant art. The teachings provided here and in the present invention can be applied to other forms of memory devices not necessarily the exemplary RFID tag generally described above. The memory devices may employ indicia other than the machine readable symbols to encode data therein, for example, magnetic tags. The memory devices may employ adhesives or securing devices other than pressure sensitive adhesives, and in some embodiments may completely omit adhesives or securing devices. Similarly, some embodiments may omit release liners. The memory devices may further be configured to communicate at frequencies other than the radio frequency range of the electromagnetic spectrum. The software program may select a taper schedule for the various antenna components to maximize the operational characteristics of the selected antenna design.

These and other changes can be made to the invention in light of the above-detailed description. In general, in the following claims, the terms used should not be construed to limit the invention to the specific embodiments disclosed in the specification and the claims, but should be construed to include all wireless communications devices including RFID tags, and methods of manufacturing wireless communications devices that operate in accordance with the claims. Accordingly, the invention is not limited by the disclosure, but instead its scope is to be determined entirely by the following claims.

What is claimed is:

1. A wireless memory tag, comprising:
   a substrate;
   a driven antenna element formed on the substrate;
   a modulation circuit electrically coupled to the driven element; and
   a first parasitic antenna element formed on the substrate electrically isolated from driven antenna element and positionable with respect to the driven antenna element to parasitically couple with the driven antenna element, wherein the substrate is folded such that the first parasitic antenna element is spaced from the driven antenna element by a distance approximately equal to one-quarter of a wavelength of an operating frequency of the wireless memory tag.

2. The wireless memory tag of claim 1 wherein the first parasitic antenna element is sized and positioned relative to the driven antenna element to form a director.

3. The wireless memory tag of claim 1 wherein the first parasitic antenna element is sized and possitioned relative to the driven antenna element to form a reflector.

4. The wireless memory tag of claim 1 wherein the first parasitic antenna element is formed on the substrate at an angle to the driven antenna element.

5. The wireless memory tag of claim 1, further comprising:
   a second parasitic antenna element formed on the substrate, wherein the driven antenna element and the first and the second parasitic elements are positionable to form a Yagi antenna.

6. The wireless memory tag of claim 1, further comprising:
   a second parasitic antenna element formed on the substrate and positionable with respect to the driven antenna element to parasitically couple with the driven antenna element, wherein the first and second parasitic antenna elements are each positioned relative to the driven antenna element was to each form a reflector.

7. The wireless memory tag of claim 1 further comprising a second parasitic antenna element formed on the substrate and positionable with respect to the driven antenna element to parasitically couple with the driven antenna element, wherein the first and the second parasitic antenna elements are each positioned relative to the driven antenna element as to each form a director.

8. The wireless memory tag of claim 1, further comprising:
a second parasitic element, wherein the first parasitic antenna element is sized and positionable with respect to the driven antenna element to form a director and the second parasitic antenna element is sized and positionable with respect to the driven antenna element to form a reflector.

9. The wireless memory tag of claim 1, wherein the first parasitic antenna element is formed as an electrically conductive trace, electrically isolated on the substrate from the modulation circuit and the driven antenna element.

10. The wireless memory tag of claim 1, wherein the folded substrate is in a substantially roll shape.

11. The wireless memory tag of claim 1, wherein the folded substrate is folded back on itself in a substantially S-shape.

12. The wireless memory tag of claim 1 wherein the first parasitic antenna element is rectangular.

13. A wireless memory tag, comprising:
a flexible substrate having a first and a second opposed surfaces, at least two portions of the substrate are fasten together to form at least one closed surface;
a driven antenna element formed on one of the surfaces of the substrate; and
a modulation circuit electrically coupled to the driven element.

14. The wireless memory tag of claim 13 wherein the flexible substrate is folded to form at a substantially oval shape.

15. A wireless memory tag, comprising
a flexible substrate having a first and a second opposed surfaces, at least two portions of the substrate are fasten together to form at least one closed surface;
a driven antenna element formed on one of the surfaces of the substrate; and
a modulation circuit electrically coupled to the driven element wherein the flexible substrate is folded to form at least one resilient elbow, the elbow biasing a first portion of the closed surface carrying the driven antenna element from a second portion of the closed surface.

16. The wireless memory tag of claim 15 wherein the flexible substrate is folded to form a substantially O-shape.

17. The wireless memory tag of claim 15 wherein the flexible substrate is folded to form at a substantially coil shape.

18. The wireless memory tag of claim 15 wherein the flexible substrate is folded to form at a substantially S-shape.

19. The wireless memory tag of claim 15, further comprising:
a parasitic antenna element formed on the second portion of the closed surface.

20. The wireless memory tag of claim 15, further comprising:
a parasitic antenna element formed on the second portion of the closed surface at an angle to the driven antenna element.

21. A circuit structure for forming a wireless communications device, comprising:
a flexible substrate;
an active antenna element formed on the substrate; and
a first passive antenna element formed on the substrate electrically isolated from the active antenna element, and positionable with respect thereto to parasitically couple with the active antenna element.

22. The circuit structure of claim 21 wherein the first passive antenna forms an angle on the substrate with respect to the active antenna element.

23. The circuit structure of claim 21 wherein the first passive antenna element is dimensioned to form a reflector.

24. The circuit structure of claim 21 wherein the first passive antenna element is dimensioned to form a director.

25. The circuit structure of claim 21, further comprising:
a second passive antenna element formed on the substrate and positionable to parasitically couple with the active antenna element, wherein the first antenna element is dimensioned to form a reflector and the second passive antenna element is dimensioned to form a director.

26. The circuit structure of claim 21, further comprising:
a modulation circuit mounted to the substrate and communicating coupled to the active antenna element.

27. The circuit structure of claim 21, further comprising:
a second passive antenna element formed on the substrate and positionable to parasitically couple with the active antenna element, wherein the first antenna element is dimensioned to form a reflector and the second passive antenna element is dimensioned to form a director, the first and the second passive elements positionable to be substantially planar with the active antenna element when the substrate is folded.

28. The circuit structure of claim 21, further comprising a second passive antenna element formed on the substrate, wherein the first antenna element is dimensioned to form a reflector and the second passive antenna element is dimensioned to form a director, the first and the second passive elements positionable to be substantially planar with the active antenna element when the substrate is folded by rolling into a substantially spiral shape.

29. The circuit structure of claim 21, further comprising a second passive antenna element formed on the substrate, wherein the first antenna element is dimensioned to form a reflector and the second passive antenna element is dimensioned to form a director, the first and the second passive elements positionable to be substantially planar with the active antenna element when the substrate is folded by folding the substrate back on itself in a substantially S-shaped configuration.

30. A circuit structure for forming a wireless communications device for communicating at a frequency, comprising:
a flexible substrate having a first surface and a second surface opposed to the first surface;
an active antenna element formed on the substrate;
a first passive antenna element formed on the substrate electrically isolated from the active antenna element, and positionable with respect thereto to electromagnetically couple therewith by folding the flexible substrate; and
a second passive antenna element formed on the substrate electrically isolated from the active antenna element, and positionable with respect thereto to electromagnetically couple therewith.

31. The circuit structure of claim 30 wherein the first and the second passive antenna elements are formed as a first and a second electrically conductive trace on a first surface of the substrate and the driven antenna element is formed as a third electrically conductive trace on the first surface of the substrate, between first and second electrically conductive traces and electrically isolated therefrom.

32. The circuit structure of claim 30 wherein the first and the second passive antenna elements are formed as a first and a second electrically conductive trace on a first surface of the substrate and the driven antenna element is formed as a third electrically conductive trace on the first surface of the substrate, between the first and second electrically conductive trace and electrically isolated therefrom;

a first tab formed at a first end of the substrate;

a first slot formed in the substrate between a second end of the substrate and the first passive antenna element;

a slit formed in the substrate between the driven antenna element and the second passive antenna element to define a second tab, the second tab receivable in the first slot when the substrate is folded back on itself into a substantially S-shape configuration; and a second slot formed in the substrate between the first passive antenna element and the driven antenna element, the second slot being positioned and dimensioned to receive the first tab when the substrate is folded back on itself into the substantially S-shape configuration.

33. The circuit structure of claim 30 wherein the first passive antenna element is formed as an electrically conductive trace on a first surface and at a first end of the substrate, the driven antenna element is formed as an electrically conductive trace on a second surface and at a second end of the substrate, and the second passive antenna element is formed as an electrically conductive trace between the first passive antenna element and the driven antenna element and on the first surface of the substrate.

34. The circuit structure of claim 30 wherein the first passive element is formed as an electrically conductive trace on a first surface and at a first end of the substrate, the driven antenna element is formed as an electrically conductive trace on the first surface and at a second end of the substrate, and the second passive antenna element is formed as an electrically conductive trace between the first passive antenna element and the driven antenna element and on a second surface of the substrate.

35. The circuit structure of claim 30 wherein the first passive element is formed as an electrically conductive trace on a first surface and at a first end of the substrate, the driven antenna element is formed as an electrically conductive trace on the first surface and at a second end of the substrate, and the second passive antenna element is formed as an electrically conductive trace between the first passive antenna element and the driven antenna element and on a second surface of the substrate;

a first formed at a first of the substrate;

a second tab formed at a second end of the substrate;

a first slot formed in the substrate between the first passive antenna element and the second passive antenna element, the first slot sized to receive the first tab; and a second slot formed in the substrate between the second passive antenna element and the driven antenna element, the second slot sized to receive the second tab.

36. The circuit structure of claim 30 wherein the first passive antenna element is aligned with and spaced from the driven antenna element by a distance substantially equal to one-quarter of an operating wave length when the substrate is folded into a substantially S-shaped configuration.

37. The circuit structure of claim 30 wherein the first passive antenna element is aligned with and spaced from the driven antenna element by a distance substantially equal to one-quarter of an operating wave length when the substrate is folded into a substantially-shaped configuration, and the second passive antenna element is aligned with and spaced from the driven antenna element by a distance substantially equal to one-quarter for the operating wave length when the substrate is folded into an substantially S-shaped configuration.

38. The circuit structure of claim 30 wherein the first passive antenna element is aligned with and spaced from the driven antenna element by a distance substantially equal to one-quarter of an operating wave length when the substrate is folded by being rolled into a substantially spiral configuration.

39. The circuit structure of claim 30 wherein the first passive antenna element is spaced from the driven antenna element by a distance substantially equal to one-quarter an operating wave length when the substrate is coiled by being folded into a substantially S-shaped configuration, and the second passive antenna element is spaced from the driven antenna element by a distance substantially equal to one-quarter of the operating wave length when the substrate is rolled into a substantially coiled configuration.

40. The circuit structure of claim 30 wherein the first passive antenna element, the second passive antenna element and the active antenna element are positioned to form a Yagi antenna.

41. The circuit structure of claim 30 wherein the substrate is folded such that the first passive antenna element, the second passive antenna element and the active antenna element from a Yagi antenna.

42. A method of forming an antenna structure, comprising:

providing a flexible substrate;

forming a first conductive trace on the substrate as a substantially straight line;

forming a second conductive trace as a substantially straight line on the substrate, the second conductive trace electrically isolated on the substrate, and spaced from and parallel to the first conductive trace; and folding the substrate to position the second conductive trace to parasitically couple with the first conductive trace within at least a portion of the electromagnetic spectrum.

43. The method of claim 42 wherein forming a first conductive trace and a second conductive trace includes printing the first and the second conductive traces on a first surface of the substrate.

44. The method of claim 42, further comprising, forming a third conductive trace electrically isolated on the substrate and parallel to the first conductive trace.

45. The method of claim 42, further comprising, forming a third conductive trace electrically isolated on a first surface of the substrate and parallel to the first conductive trace wherein forming a first conductive trace and a second conductive trace includes printing the first and the second conductive traces on a first surface of the substrate.

46. The method of claim 42, further comprising, forming a third conductive trace electrically isolated on a first surface of the substrate and parallel to the first conductive trace wherein forming a first conductive trace and a second conductive trace includes printing the first and the second conductive traces and a second surface of the substrate.

47. The method of claim 42, further comprising,
determining a distance for spacing the second conductive trace along the substrate form the first conductive trace based on a diameter of the substrate when coiled for use.

48. The method of claim 42, further comprising,
electrically coupling the first conductive trace to a driving circuit.

49. The method of claim 42 wherein folding the substrate comprises rolling substrate into a substantially spiral shape.

50. The method of claim 42 wherein coiling the substrate comprises folding the substrate back itself into a substantially S-shape.

51. The method of claim 42, further comprising:
forming a third conductive trace electrically isolated on the substrate and parallel to the first conductive trace; and
folding the substrate to position the second conductive trace to parasitically coupled with the first conductive trace with at least a portion of the electromagnetic spectrum.

52. A wireless memory tag, comprising
a first substrate having a non-planarity;
a driven antenna element formed on the first substrate;
a transceiver coupled to drive the driven antenna element; and
a first conductive element electrically isolated from driven antenna element and spaced therefrom by the non-planarity to from a reflector aligned with the driven antenna element to provide a directionality to the wireless memory tag, wherein non-planarity spaces the first conductor form the driven antenna element by at least one quarter of a wavelength corresponding to an operating frequency of the driven antenna element.

53. The wireless memory tag of claim 52 wherein the first conductive element comprises a metal surface.

54. The wireless memory tag of claim 52 wherein the first conductive element comprises a metal surface of an item to which the wireless memory tag is secured.

55. The wireless memory tag of claim 52 wherein the first conductive element comprises a conductive trace formed on a second substrate different from the first substrate.

56. The wireless memory tag of claim 52 wherein the first conductive element comprises a conductive trace formed on the first substrate.

57. The wireless memory tag of claim 52 wherein the non-planarity comprises at least a first bend in the first substrate.

58. The wireless memory tag of claim 52 wherein the non-planarity comprises at least a first crease in the first substrate.

59. The wireless memory tag of claim 52 wherein the first substrate has a substantially C-shaped cross-section.

60. The wireless memory tag of claim 52 wherein the first substrate has a substantially U-shaped cross-section.

61. The wireless memory tag of claim 52 wherein the first substrate has a substantially Z-shaped cross-section.

62. A wireless memory tag, comprising:
a non-planar substrate;
a driven antenna element formed on a portion of the substrate;
a drive circuit coupled to drive the driven antenna element; and
an antenna reflector electrically isolated from driven antenna element and spaced therefrom to enhance a directionality of the driven antenna element wherein the antenna reflector is spaced from the driven antenna element by at least one quarter of a wavelength corresponding to an operating frequency of the driven antenna element.

63. The wireless memory tag of claim 62 wherein the antenna reflector comprises a metal surface.

64. The wireless memory tag of claim 62 wherein the antenna reflector comprises a metal surface of an item to which the wireless memory tag is secured.

65. The wireless memory tag of claim 62 wherein the antenna reflector comprises a conductive trace formed on a second substrate different from the first substrate.

66. The wireless memory tag of claim 62 wherein the antenna reflector comprises a conductive trace formed on the substrate.

67. The wireless memory tag of claim 62 wherein the substrate includes at least a first bend.

68. The wireless memory tag of claim 62 wherein the substrate includes at least a first crease.

69. The wireless memory tag of claim 62 wherein the substrate has a substantially C-shaped cross-section.

70. The wireless memory tag of claim 62 wherein the substrate has a substantially U-shaped cross-section.

71. The wireless memory tag of claim 62 wherein the substrate has a substantially Z-shaped cross-section.

* * * * *

UNITED STATES PATENT AND TRADEMARK OFFICE
CERTIFICATE OF CORRECTION

PATENT NO. : 6,278,413 B1
DATED : August 28, 2001
INVENTOR(S) : Steven C. Hugh, Christopher A. Wiklof and Terry M. Hudkins It is certified that error appears in the above-identified patent and that said Letters Patent is hereby corrected as shown below:

Column 10, claim 6,
Line 62, "first and second" should read -- first and the second --.

Column 12, claim 26,
Lines 22 and 23, "the substrate and communicating" should read -- the substrate and communicatingly --.

Column 13, claim 32,
Lines 9 and 10, "conductive trace and" should read -- conductive traces and --.

Column 14, claim 37,
Line 3, "into a substantially-shaped" should read -- into a substantially S-shaped --.

Column 14, claim 39,
Line 17, "one-quarter an" should read -- one-quarter of an --.

Signed and Sealed this

Twelfth Day of March, 2002

*Attest:*

*Attesting Officer*

JAMES E. ROGAN
*Director of the United States Patent and Trademark Office*